United States Patent [19]
Wilkerson

[11] 3,869,798
[45] Mar. 11, 1975

[54] QUICK-CHECK ALIGNER

[76] Inventor: Edward D. Wilkerson, P.O. Box 755 S. Court, Normandy Beach, N.J. 08739

[22] Filed: Dec. 19, 1973

[21] Appl. No.: 425,990

[52] U.S. Cl................... 33/264, 33/203.18, 33/336, 248/205 R
[51] Int. Cl. ...................... G01c 15/00, G01b 5/255
[58] Field of Search............ 33/203.18, 203.15, 203, 33/288, 264, 336, 203.16, 169 R; 248/205 R

[56] References Cited
UNITED STATES PATENTS

| | | | |
|---|---|---|---|
| 2,137,485 | 11/1938 | Greenleaf et al. | 33/203.15 X |
| 3,242,579 | 3/1966 | Cermenaro et al. | 33/203.15 |
| 3,445,936 | 5/1969 | Wilkerson | 33/203.18 X |
| 3,736,665 | 6/1973 | La Moreux | 33/203.16 X |

Primary Examiner—William D. Martin, Jr.

[57] ABSTRACT

An optical-transit aligner for vehicle wheels. The aligner comprises two separate aligner posts each hung by a simple contact mount, without clamping attachments, upon different and opposite wheels of a vehicle under test. An optical sight, including a camber and toe target, is fixed to the upper end of each aligner post. Camber and toe readings of both wheels are taken without resort to manual adjustments of the optical sights. An optional run-out arm, including a friction contact wheel, can be pivotally coupled to an aligner post, which has been removed from a wheel mounted position and floor supported, to determine the degree of wheel wobble.

6 Claims, 8 Drawing Figures

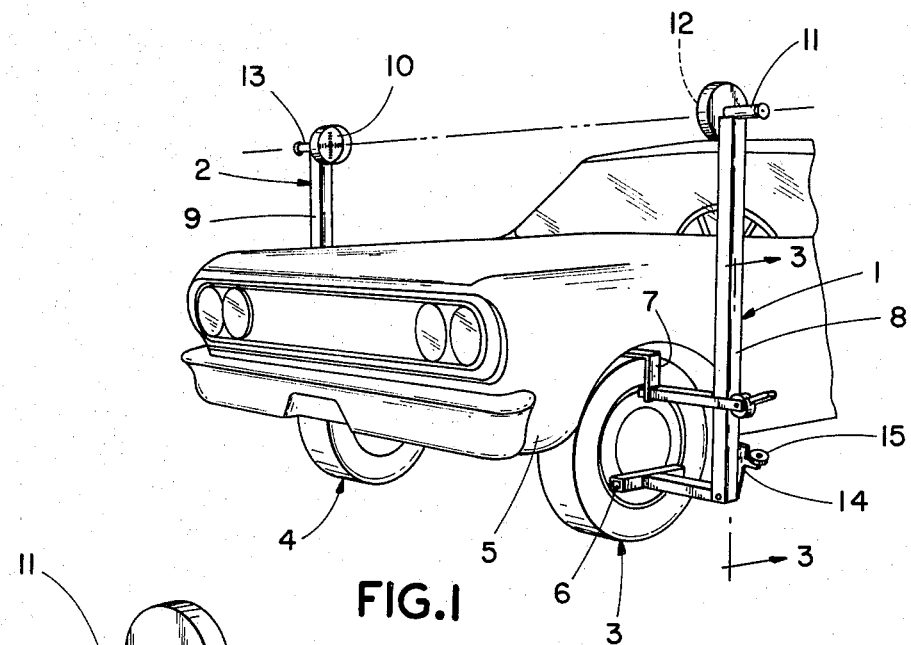
FIG.1
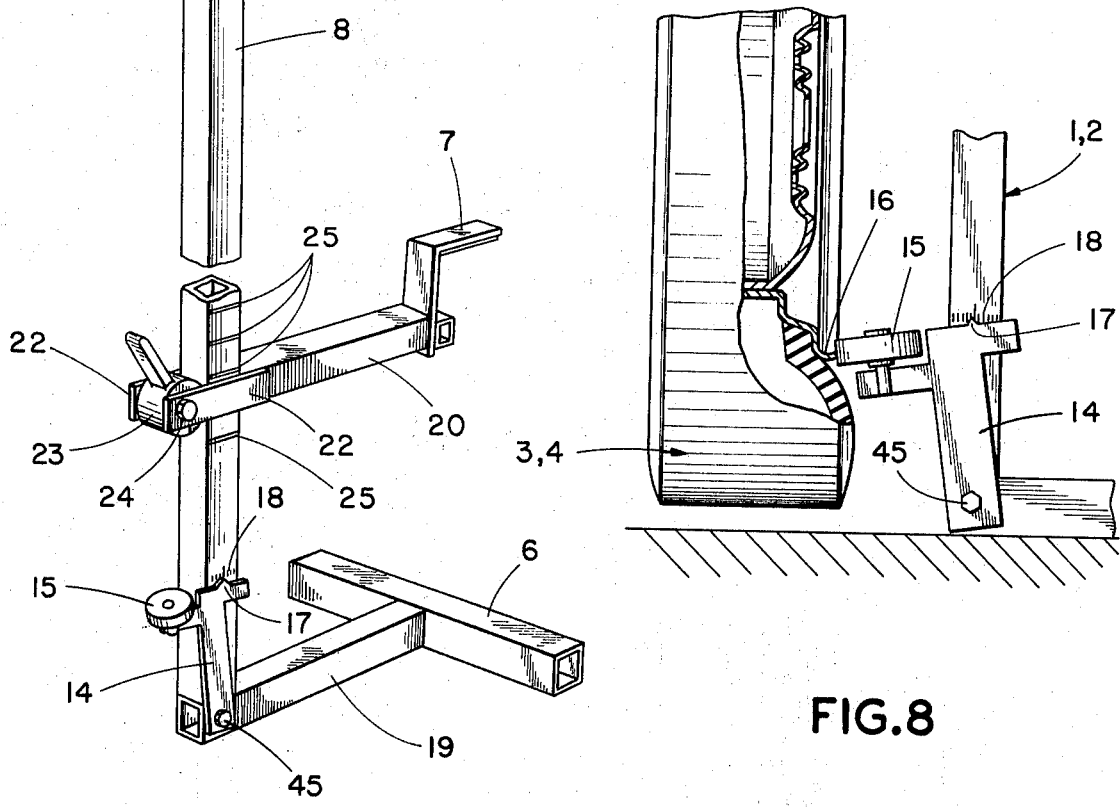
FIG.2
FIG.8

3,869,798

QUICK-CHECK ALIGNER

BACKGROUND OF THE INVENTION

Within recent years increased attention has been directed to safer vehicle design and operation. Misalignment of vehicle wheels has long been recognized as contributing directly to a substantial number of accidents. Notwithstanding this situation, many vehicle operators neglect to have their vehicles periodically checked for possible dangerous wheel alignment conditions.

Wheel alignment testing is a fairly cumbersome operation which, therefore, involves a substantial amount of a mechanic's time. Accordingly, a need exists for an aligner which will quickly check the principal attitudes of a pair of steerable wheels responsible for proper front end vehicle wheel geometry. These attitudes are camber and toe angles. Caster angles appear to be of lesser importance from a safety aspect.

The United States Department of Transportation has recently issued directives which specify parameters for checking the two alignment angles, camber and toe, which are primarily responsible for the buildup of static tension in the control linkages of steerable wheels. Such tension is a consequence of the tires attempting to roll in opposing directions due to excess camber or toe.

SUMMARY OF THE INVENTION

In order to improve voluntary compliance with pertinent safety standards, it is advisable to simplify wheel alignment testing. The time involved in testing, as distinguished from alignment correcting, must be reduced. This of necessity must involve simpler structures and procedures than those described in the inventor's U.S. Pat. No. 3,445,936, for example, which is designed for both precision testing and correction.

If a simple test, quickly and inexpensively performed, indicates unsafe wheel alignment, then more complex alignment procedures with relatively sophisticated equipment can be undertaken.

The novel aligner herein described is intended to facilitate a sufficiently quick and easy check of the toe and camber alignment angles so that vehicle owners will be less reticent to undergo a safety test.

The general alignment structure is described in the Abstract. It is noteworthy that the optical-transit aligner units are simply hung upon appropriate wheels. The necessity for clamping mounting elements has been eliminated. Wheel run-out procedures involved in many prior art aligner units clamped to wheels are also eliminated.

The optical-transit unit coupled to each aligner unit is rigidly fixed to the supporting aligner post. Accordingly, operator manipulation of knobs to read camber and toe angles is not required.

If testing indicates unsafe angles, a ready and optional determination of wheel run-out can be made by an optional attachment to one aligner unit.

The novel aligner hereafter described in detail performs the foregoing tests independent of external references such as gravity indicators, level floors, level racks, mirrors, light beams or wall panels.

DETAILED DESCRIPTION OF THE DRAWINGS

In order that all of the structural features of this invention may be readily understood, reference is herein made to the drawings, wherein:

FIG. 1 is a perspective view showing the application of the two aligner posts, which comprise the aligner of this invention, to the front wheels of a vehicle under alignment inspection;

FIG. 2 is a perspective view of an aligner post with the pivoted run-out arm attached;

FIG. 8 is a view showing operative disposition of the run-out arm relative a vehicle wheel.

DETAILED DESCRIPTION OF THE PREFERRED EMBODIMENT

Figure 3:
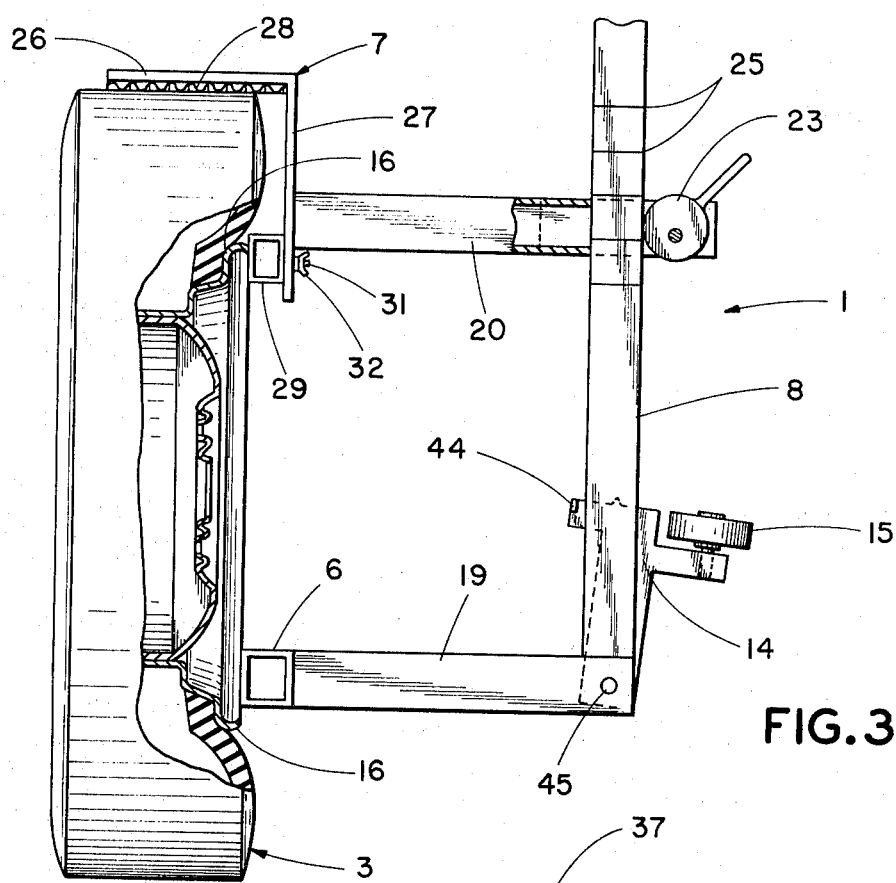
FIG. 3 is a side elevation view, taken along line 3—3 of FIG. 1, showing the mounting of the aligner post of FIG. 2 to a vehicle wheel.

FIG. 1 shows the application of the quick-check aligner of this invention to the two front wheels of a vehicle. When each of the two identical aligner units 1, 2 is individually and appropriately mounted on a different front wheel-tire assembly 3, 4 generally as shown, camber and toe alignment measurements can be quickly and easily made.

In general, these advantages result because aligner units 1, 2 are simply coupled to their respective wheel-tire assemblies 3, 4 by contact placement of the aligner mounting elements (including contact arm 6 and friction hanger 7 of aligner unit 1, for example) so that each aligner post 8, 9 is the vertical position in a longitudinal plane of vehicle 5 and also in a plane parallel to the plane of the wheel-tire assembly to which each aligner post 8, 9 is mounted.

Figure 7:
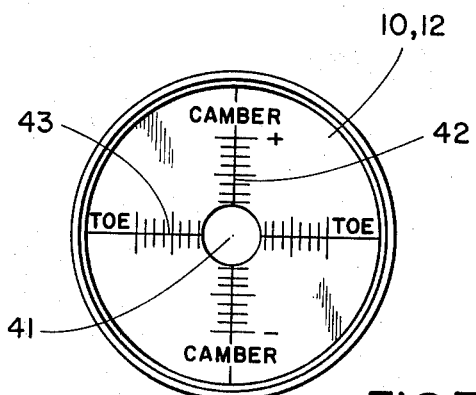
FIG. 7 is a front view of the target disc showing the camber and toe readout scales.

With the foregoing disposition of the aligner posts, camber and toe readings for wheel-tire assembly 3 are read off of vertical and horizontal scales, respectively, of target 10 (FIG. 7) of unit 2 by viewing the target through optical sight 11 of unit 1.

Similarly, the camber reading for wheel-tire assembly 4 is read off of a vertical scale of target 12 (FIG. 7) of unit 1 by viewing the target through optical sight 13 of unit 2. Since toe of two opposite wheels is a combined measurement, it need not be read on each wheel.

If the camber and toe readings are beyond tolerance, the vehicle is rejected. If desired, the wheel-tire assembly run-out, if any, can be detected by use of the run-out tester. Briefly, this test is made by removing each aligner unit 1, 2 from its mounted position on its assembly 3, 4. Using one aligner unit 3 or 4 in a reversed and floor supported position, as shown in FIG. 8, gravity-actuated, run-out arm 14 is pivoted to place run-out wheel 15 in contact with any uniform circular surface on wheel assembly 3, 4 (such as rim 16, for example). With the wheel jacked from the floor and manually rotated slowly, variations in run-out can be visually read by watching the relative movement of pointer 17 on scale 18. Pointer 17 projects fixedly from arm 14, and scale 18 is affixed to the body of post 8, 9. Run-out arm 14 swings on pivot shaft 45. The shaft may be withdrawn so that arm 14 can be separated from its post during camber and toe testing. Limit tab 44 (FIG. 3) restricts the pivotal movement of arm 14 so that the arm will not fall to the floor.

The wheel mount structure for typical aligner unit 1 is shown in detail in FIGS. 2 and 3. Lower extension arm 19 is fixed to the lower end of post 8 with the longitudinal axis of arm 19 being at an exact right angle to the longitudinal axis of post 8. Contact arm 6 is fixed to the projecting end of extension arm 19 with the longitudinal axis of contact arm 6 being perpendicular to the longitudinal axis of arm 19 and also perpendicular to, but offset from, the longitudinal axis of post 8.

Elements 6, 8, 19 and upper extension arm 20 are fabricated of square metal tubing, and all fixed joints are welded.

Upper extension arm 20 is adjustably clamped to post 8. The longitudinal axis of arm 20 is perpendicular to the longitudinal axis of post 8 and parallel to and in the same plane as the longitudinal axis of arm 19. A clamping yoke for post 8 is formed by metal yoke sections 22 which are welded to the post end of arm 20. The cylindrical body of clamp 23 is eccentrically pivoted between yoke sections 22 on shaft 24. Manual operation of the clamp 23 handle both loosens and tightens arm 20 against post 8.

Spaced height indicia markers 25 are affixed to a side surface of post 8. In the making of accurate alignment measurements, it is mandatory that the aligner units 1, 2 be mounted at the same heights relative the supporting wheel-tire assemblies 3, 4. Accordingly, the corresponding upper extension arm 20 of each aligner unit 1, 2 must be positioned at the same relative height position on its associated post 8, 9. The height reading is made by determining the position of a yoke section 22 with respect to a particular one of markers 25.

The projecting end of upper extension arm 20 carries friction mounting hanger 7. Hanger 7 is a metal right angle. Hanger 7 includes a friction leg 26 and a contact leg 27. A corrugated gripper plate 28 is affixed to the lower surface of friction leg 26. A vertically adjustable contact button 29 is carried by the lower end of contact leg 27.

A threaded shaft 31 fixed to button 29 passes through an adjustment slot (not shown) formed in leg 27. In a preferred mounting of the aligner unit 1, extension arms 19 and 20 are appropriately spaced on post 8 so that contact button 29 and contact arm 6 rest against spaced areas on rim 16. With this disposition, the longitudinal axis of aligner post 8 is located in a plane parallel to the plane of wheel-tire assembly 3. Wing nut 32 is tightened after button 29 is properly positioned.

After aligner unit 1 is mounted, aligner unit 2 may be similarly mounted. Both units must be mounted at the same height by loosening the clamp 23 of each unit and moving the arm 20 of each unit to an identical height position on the coupled post 8, 9.

An alternative and satisfactory mounting structure can be provided by omitting contact button 29 and appropriately shortening arm 19 to place the surfaces of leg 27 and arm 6 facing wheeltire assembly 3 in the same plane. With this modification, the three mounting reference points are obtained from the tire sidewall rather than rim 16.

Figure 4:
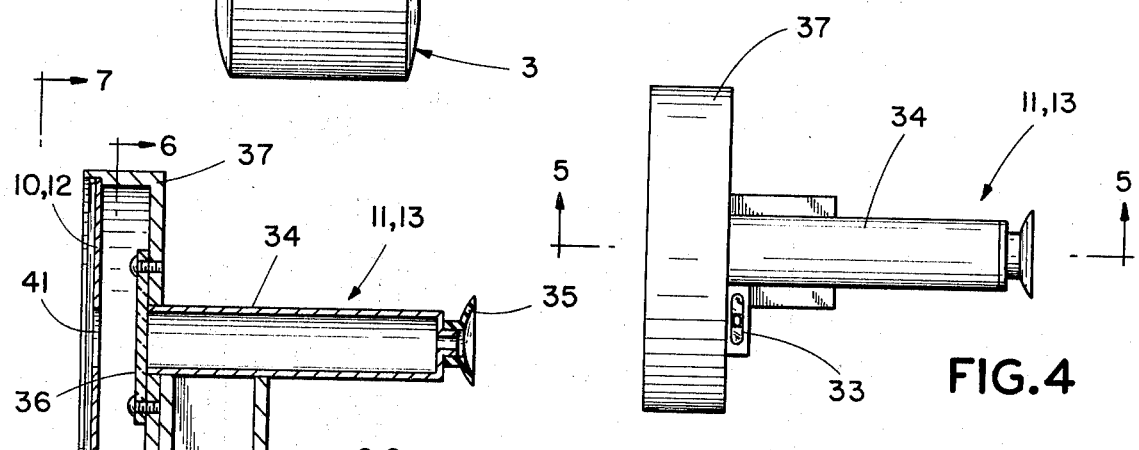
FIG. 4 is a plan view of the optical sight and target mounted on each post.

In FIG. 4, a spirit level 33 is shown mounted adjacent optical sight 11, 13 on the upper end of aligner unit 1, 2. The longitudinal axis of the spirit vial is transverse to the longitudinal axis of sight tube 34. Accordingly, during the mounting of aligner unit 1, the centering of the spirit bubble indicates that the aligner unit 1 is vertically disposed in a longitudinal plane of vehicle 5 as required for camber and toe readings.

Figure 5:
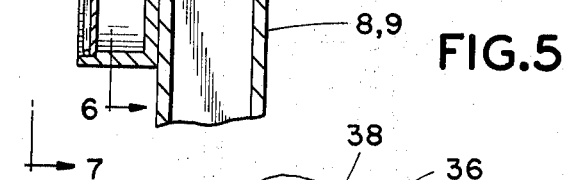
FIG. 5 is a section view, taken along line 5—5 of FIG. 4, showing the relative disposition of the sight tube, crosshair disc, and circular target.
Figure 6:
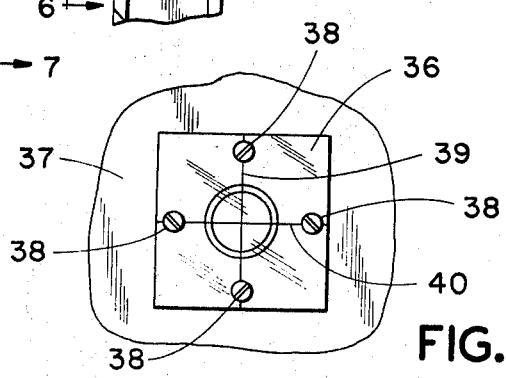
FIG. 6 is a section view taken along line 6—6 of FIG. 5, showing the disposition of the crosshairs on the disc.

An identical optical-transit head is disposed at the upper end of each aligner post 8, 9. Referring to FIGS. 4 and 5, each head comprises as its principal elements a crossline optical sight 11, 13 and a measurement target 12, 13. Sight 11, 13 includes a cylindrical tube 34 welded to the upper end of post 8, 9. Eye piece 35 is carried at the right end of the tube, and the other end is closed by crossline plate 36 (FIG. 6). Plate 36 is fastened to target drum 37 by four screws 38. Plate 36 is preferably fabricated of a transparent plastic inasmuch as visual target measurements must be made through the body of the plate. Vertical crossline 39 establishes the toe reading on the horizontal scale of the opposite target (FIG. 7), and horizontal crossline 40 establishes the camber reading on the vertical scale of the opposite target.

The projecting annular lip of target drum 37 carries circular target disc 10, 12. Disc 10, 12 is spaced from crossline plate 36. Disc 10, 12 is formed with a small control hole 41 (FIG. 7) so that visual measurements made through the sight tube will not be obstructed.

The circle of target 10, 12 is divided into four quadrants by vertical camber scale 42 and horizontal toe scale 43. Positive camber is measured by the upper half, and negative camber is measured by the lower half. Toe out is measured by the front half of the toe scale 43 (located toward the front of the vehicle under test), and toe in is measured by the rear half of toe scale 43.

In the fabrication of each aligner unit, it is essential that the line of sight provided by each optical sight be perpendicular to the longitudinal axis of the aligner post 8, 9, or more fundamentally, perpendicular to the plane of the wheel-tire assembly. The intersection point of crosslines 39, 40 must be located on this line of sight, and the imaginary intersection point (hole 40 eliminates an actual intersection of the two scales) of camber scale 42 and toe scale 43 must also be on the line of sight.

It should be understood that the above described embodiment is illustrative of the principles of this invention, and that modifications can be made without departing from the scope of the invention.

What is claimed is:

1. In an optical-transit aligner unit for a wheel-tire assembly, the improved assembly mount comprising an elongated aligner post adapted for generally vertical disposition by support upon an assembly to be checked for alignment, an upper extension arm adjustably coupled to a general midportion of the aligner post, a mounting hanger carried by an end of the upper extension arm remote from the aligner post, said mounting hanger being the sole mounting hanger of the aligner unit, the mounting hanger including a friction element for frictionally engaging the uppermost portion of a tire tread and a second element for contacting a first mounting reference point on the wheel rim in the assembly, a lower extension arm fixed to and projecting perpendicularly from the lower extremity of the aligner post, and a contact arm carried by an end of the lower extension arm remote from the aligner post with the contact arm and the lower extension being disposed generally perpendicular to one another and in the same plane so that the projecting extremities of the contact arm nest against second and third contact reference points on the wheel rim on the assembly.

2. The combination of claim 1 in which the lower extension arm and the contact arm form a supporting base when the aligner unit is dismounted from the wheel tire assembly comprising a run-out arm pivotally mounted to the lower extremity of the aligner post, a run-out wheel rotatably supported on the run-out arm, and a run-out indicator actuated by the run-out arm in response to contact variations caused by displacement of the run-out wheel by a rotating assembly.

3. In an optical-transit aligner unit for a wheel-tire assembly, the improved assembly mount comprising an elongated aligner post adapted for generally vertical disposition by support upon an assembly to be checked for alignment, a mounting hanger adjustably coupled to the post to assume different floor heights, said mounting hanger being the sole mounting hanger of the aligner unit, the mounting hanger including a friction element for frictionally engaging the uppermost portion of a tire tread and a second element for contacting a first mounting reference point on the wheel rim of the assembly, and means coupled to the post including second and third contact elements for contacting second and third mounting reference points on the wheel rim of the assembly generally symmetrically disposed and equidistant from the first mounting reference point.

4. The combination of claim 3 in which the lower extension arm and the contact arm form a supporting base when the aligner unit is dismounted from the wheel tire assembly, comprising a run-out arm pivotally mounted to the lower extremity of the aligner post, a run-out wheel rotatably supported on the run-out arm and adapted for contact against the assembly by removal of the aligner unit from a mounted position in the assembly and resting the lower contact arm and the lower extension of the unit on the assembly support surface and pivoting the run-out arm toward the assembly to rest the wheel against the assembly.

5. The combination of claim 4, comprising a run-out indicator having elements coupled to the run-out arm and also to the post whereby the relative position of the elements in response to rotation of the assembly renders an indication of run-out.

6. The combination of claim 5, in which the run-out indicator elements include a pointer attached to the run-out arm and an indicator scale affixed to the post.

* * * * *